US012291846B2

(12) United States Patent
Ready-Campbell et al.

(10) Patent No.: US 12,291,846 B2
(45) Date of Patent: *May 6, 2025

(54) AUTONOMOUS OFFROAD VEHICLE PATH PLANNING WITH COLLISION AVOIDANCE

(71) Applicant: Built Robotics Inc., San Francisco, CA (US)

(72) Inventors: Noah Austen Ready-Campbell, San Francisco, CA (US); Martin Karlsson, Lund (SE); Brian Lerner, Boca Raton, FL (US)

(73) Assignee: Built Robotics Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,441

(22) Filed: Jun. 11, 2024

(65) Prior Publication Data

US 2025/0003189 A1    Jan. 2, 2025

Related U.S. Application Data

(63) Continuation of application No. 18/343,753, filed on Jun. 29, 2023, now Pat. No. 12,037,769.

(51) Int. Cl.
*E02F 9/20* (2006.01)
*G05D 1/00* (2024.01)

(52) U.S. Cl.
CPC ............ *E02F 9/2045* (2013.01); *E02F 9/205* (2013.01); *G05D 1/0214* (2013.01); *G05D 1/0274* (2013.01)

(58) Field of Classification Search
CPC ...... E02F 9/2045; E02F 9/205; G05D 1/0214; G05D 1/0274
See application file for complete search history.

(56) References Cited

U.S. PATENT DOCUMENTS

| | | | |
|---|---|---|---|
| 11,429,110 B1 | 8/2022 | Webster et al. | |
| 2007/0002040 A1* | 1/2007 | Oldroyd | G01C 11/00 345/419 |
| 2011/0231016 A1 | 9/2011 | Goulding | |
| 2018/0120856 A1* | 5/2018 | Gabardos | G05D 1/0274 |
| 2018/0216942 A1 | 8/2018 | Wang et al. | |

(Continued)

OTHER PUBLICATIONS

United States Office Action, U.S. Appl. No. 18/343,753, Sep. 15, 2023, 13 pages.

*Primary Examiner* — Peter D Nolan
*Assistant Examiner* — Demetra R Smith-Stewart
(74) *Attorney, Agent, or Firm* — Fenwick & West LLP

(57) ABSTRACT

A robot generates a cell grid (e.g., occupancy grid) representation of a geographic area. The occupancy grid may include a plurality of evenly sized cells, and each cell may be assigned an occupancy status, which can be used to indicate the location of obstacles present in the geographic area. Footprints for the robot corresponding to a plurality of robot orientations and joint states may be generated and stored in a look-up table. The robot may generate a planned path for the robot to navigate within the geographic area by generating a plurality of candidate paths, each candidate path comprising a plurality of candidate robot poses. For each candidate robot pose, the robot may query the look-up table for a corresponding robot footprint to determine if a collision will occur.

20 Claims, 8 Drawing Sheets

(56) References Cited

U.S. PATENT DOCUMENTS

| | | | |
|---|---|---|---|
| 2018/0281191 A1* | 10/2018 | Sinyavskiy | A47L 11/4061 |
| 2019/0337154 A1* | 11/2019 | Holson | B25J 9/1697 |
| 2021/0278851 A1* | 9/2021 | Van der Merwe | G06V 10/764 |
| 2022/0026920 A1 | 1/2022 | Ebrahimi Afrouzi et al. | |
| 2022/0066456 A1 | 3/2022 | Ebrahimi Afrouzi et al. | |
| 2022/0187841 A1 | 6/2022 | Ebrahimi Afrouzi et al. | |

* cited by examiner

400

```
┌─────────────────────────────────────────────────────────┐
│  Partition a representation of a geographic area into a │
│                       cell grid                          │
│                         405                              │
└─────────────────────────────────────────────────────────┘
                            │
                            ▼
┌─────────────────────────────────────────────────────────┐
│ Generate, for each of a plurality of combinations of    │
│ orientation and joint state of a robot, a footprint of  │
│            the robot within the cell grid               │
│                         410                              │
└─────────────────────────────────────────────────────────┘
                            │
                            ▼
┌─────────────────────────────────────────────────────────┐
│     Store the generated footprints within a look-up     │
│                        table                             │
│                         415                              │
└─────────────────────────────────────────────────────────┘
                            │
                            ▼
┌─────────────────────────────────────────────────────────┐
│ Generating a planned path for the robot to traverse     │
│              within the geographic area                 │
│                         420                              │
└─────────────────────────────────────────────────────────┘
                            │
                            ▼
┌─────────────────────────────────────────────────────────┐
│ Identify combinations of orientation and joint state of │
│ the robot at cells within the cell grid corresponding   │
│   to the robot as the robot traverses the planned path  │
│                         425                              │
└─────────────────────────────────────────────────────────┘
                            │
                            ▼
┌─────────────────────────────────────────────────────────┐
│ Query the look-up table with the identified combinations│
│ of orientation and joint state to identify a set of     │
│ footprints of the robot as the robot traverses the      │
│                    planned path                          │
│                         430                              │
└─────────────────────────────────────────────────────────┘
                            │
                            ▼
┌─────────────────────────────────────────────────────────┐
│ Identify path conflicts by applying the identified set  │
│ of footprints of the robot at cells within the cell     │
│ grid corresponding to the robot as the robot traverses  │
│                  the planned path                        │
│                         435                              │
└─────────────────────────────────────────────────────────┘
```

AUTONOMOUS OFFROAD VEHICLE PATH PLANNING WITH COLLISION AVOIDANCE

CROSS REFERENCE TO RELATED APPLICATIONS

This application is a continuation of U.S. application Ser. No. 18/343,753, filed Jun. 29, 2023, now U.S. Pat. No. 12,037,769, which is incorporated by reference in its entirety.

TECHNICAL FIELD

The following disclosure relates generally to directing robots in a geographic area, and, more specifically, using a look-up table for path planning and collision checking for an autonomous offroad vehicle.

BACKGROUND

In recent years, path planning and collision checking have grown in importance due to emerging trends in robotics and automation. However, the navigation of robots using path planning and collision checking algorithms is a challenging task for various reasons. A main challenge is the computational complexity involved in generating collision-free paths. Path planning and collision checking algorithms can be time consuming due to the large number of robot states that need to be checked to generate an optimal path. As the size and complexity of the environment increases, the number of states can grow exponentially which may lead to an increase in computational effort and time required to generate a collision-free path.

SUMMARY

Embodiments relate to a path planning and collision avoidance navigation system based on a look-up table, used for autonomous navigation of a robot within a geographic area. The method may include generating a cell grid representation (e.g., occupancy map) of a geographic area where a path is to be planned for the robot. Each cell of the occupancy grid may be assigned an occupancy status, which may be used to indicate the location of obstacles present in the geographic area. The method may further include generating footprints for the robot at a plurality of orientations and joint states. The generated footprints may be stored in a look-up table. The method may further include generating a planned path for the robot to navigate within the geographic area by generating a plurality of candidate paths, each candidate path comprising a plurality of candidate robot poses. For each candidate robot pose, the method may query the look-up table for a corresponding robot footprint to determine if a collision will occur. A candidate path is not feasible if a collision occurs along the candidate path.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 4 is a flowchart that depicts an example process for generating a planned path for a robot, in accordance with some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

This disclosure pertains to autonomous robots for performing various autonomous operations. As used herein, "robot" refers to any vehicle, apparatus, or multi-unit system, that moves and/or operates autonomously. The robots are configured to operate on paved surfaces as well as in off-road environments (e.g., on surfaces other than paved roadway). The robots may include any tracked vehicle, construction vehicle, robot, transport vehicle, delivery vehicle, distribution vehicle, autonomous passenger vehicles, warehouse robots, field robots, and the like. Some examples of construction vehicles may include pile driving systems and earth-moving systems. Example off-road environments include solar farms, dirt roads, fields, agricultural sites, rocky or gravel terrain, construction sites, forest or wooded sites, hill or mountain trails or sites, underground sites, indoor sites, rooftops, and the like. As used herein, "autonomous" refers to the ability of the off-road vehicle to operate without constant human supervision, for instance enabling the off-road vehicle to move, navigate, perform a function, and/or make a decision without explicitly receiving instructions from a human operator.

The systems and methods disclosed herein relate to a path planning and collision avoidance navigation system based on a look-up table, used for autonomous navigation of a robot within a geographic area. In some path planning and collision checking approaches, a footprint of the robot is computed for every potential pose of the robot along a path to determine if a path is feasible, which can be a computationally expensive and time-consuming process. Hence, instead of re-computing footprints for every candidate location, orientation, and joint position, the system can store pre-computed footprints in a look-up table. Since accessing the look-up table for a pre-computed footprint is a fast operation, the time needed for collision checking may be reduced.

Example Autonomous Off-Road Vehicle System Environment

Figure 1:
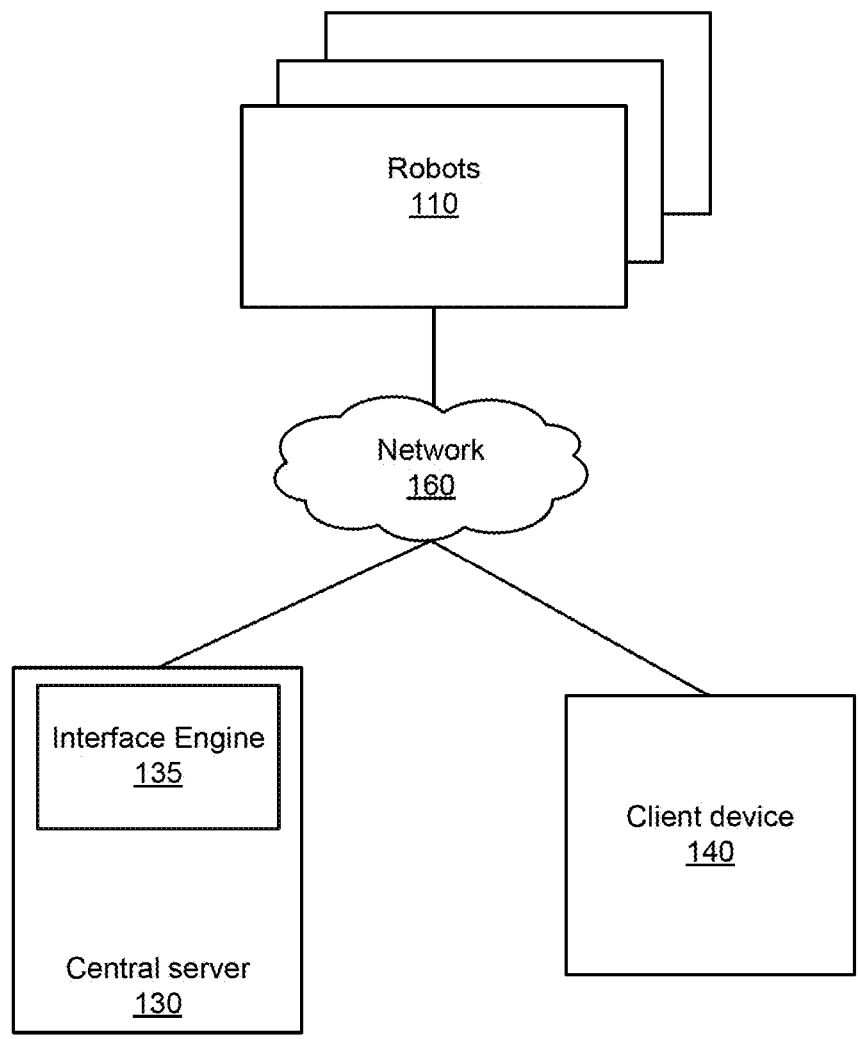
FIG. 1 illustrates an autonomous off-road vehicle system environment 100, according to some embodiments.

FIG. 1 illustrates a robot system environment 100, according to some embodiments. The environment 100 of FIG. 1 includes one or more robots 110, a central server 130, and a client device 140, each communicatively coupled via a network 160. It should be noted that in other embodiments, the environment 100 may include different, fewer, or additional components than those illustrated in FIG. 1. For instance, the client device 140 and the central server 130 may be the same device.

Each robot 110 of FIG. 1 may be a vehicle (e.g., item of heavy equipment, vehicle, apparatus, system, robot, and the like) that is configured to move and/or operate autonomously and that is configured to communicate with the central server 130. Examples of robots 110 within the scope of this description include, but are not limited to, off-road vehicles, construction vehicles, passenger vehicles, warehouse robots, and field robots. Examples of construction vehicles include, but are not limited to, pile loaders, pile drivers, pile driving rigs, pile distribution vehicles, pile basket assembly robots, loaders such as backhoe loaders, track loaders, wheel loaders, skid steer loaders, scrapers, graders, bulldozers, compactors, excavators, mini-excavators, trenchers, skip loaders, tracked vehicles, construction vehicles, tractors, transport vehicles, delivery vehicles, distribution vehicles, and the like. Collectively, robots 110 may correspond to a robot fleet that includes one or more of each of different types of robots 110 that respectively have different functionality.

The central server 130 is a computing system located remotely from the robot 110. In some embodiments, the central server is a web server or other computer configured to receive data from and/or send data to one or more robots 110 within the environment 100. In some embodiments, the central server 130 receives information from the robot 110 (e.g., obstacle data, sensor data, etc.) indicating a location of the robot 110, a result of a function or operation being performed by the robot 110, a state of one or more vehicles, information describing the surroundings of the robot 110, and the like. In some embodiments, the central server 130 may receive a real-time feed of data from the robot 110, such as a real-time video feed of the environment surrounding the robot. In some embodiments, the central server 130 can provide information to the robot 110, such as an instruction to perform an operation or function (e.g., pile driving operation on a set of locations), a navigation instruction (such as a route), synced obstacle data, and the like. In some embodiments, the central server 130 can enable a remote operator to assume manual control of the robot 110 and provide manual navigation or operation instructions to the robot. In some embodiments, some of the functionality of the robot 110 may be subsumed by the central server 130. For example, sensor data from the robot 110 may be transmitted to the central server 130, and the central server 130 may subsume the functionality corresponding to one or more of the occupancy grid generation operations and the like.

The central server 130 may include an interface engine 135 configured to generate one or more interfaces for viewing by a user (such as a user of the central server 130 or a user of the client device 140). The user can be a remote operator of the robot 110, can be an individual associated with the environment 100 (such as a supervisor, a consultant, etc.), can be an individual associated with the robot 110 (such as an operator, a repairman, an on-site coordinator, or the like), or can be any other suitable individual. The interface engine 135 can be used by a user to provide one or more instructions to a robot 110, such as autonomous navigation instructions, operation or function instructions, remote piloting instructions, and the like. The interface engine 135 can generate a user interface displaying information associated with the robot 110, other vehicles, or the environment 100. For instance, the user interface can include a map illustrating a location and/or movement of each of the robots 110 within the geographic area, an occupancy grid generated for each robot 110, a respective set of locations to be visited by each robot 110, a status of the robot 110, any notifications or other data received from each robot 110, and the like. The user interface can display notifications generated by and/or received from the robot 110, for instance, within a notification feed, as pop-up windows, using icons within the map interface, and the like. By communicatively coupling to multiple robots 110, the central server 130 beneficially enables one user to track, monitor, and/or control multiple robots simultaneously.

The client device 140 is a computing device, such as a computer, a laptop, a mobile phone, a tablet computer, or any other suitable device configured to receive information from or provide information to the central server 130. The client device 140 includes a display configured to receive information from the interface engine 135, that may include information representative of one or more of the robots 110 or the environment 100. The client device 140 can also generate notifications (e.g., based on notifications generated by a robot 110) for display to a user. The client device 140 can include input mechanisms (such as a keypad, a touchscreen monitor, and the like), enabling a user of the client device to provide instructions to a selected one of the robots 110 (via the central server 130). It should be noted that although the client device 140 is described herein as coupled to a robot 110 via the central server 130, in practice, the client device 140 may communicatively couple directly to the robot (enabling a user to receive information from or provide instructions to the robot 110 without going through the central server 130).

As noted above, the systems or components of FIG. 1 are configured to communicate via a network 160, which may include any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, all or some of the communication links of the network 160 may be encrypted using any suitable technique or techniques.

Example Robot Configuration

Figure 2:
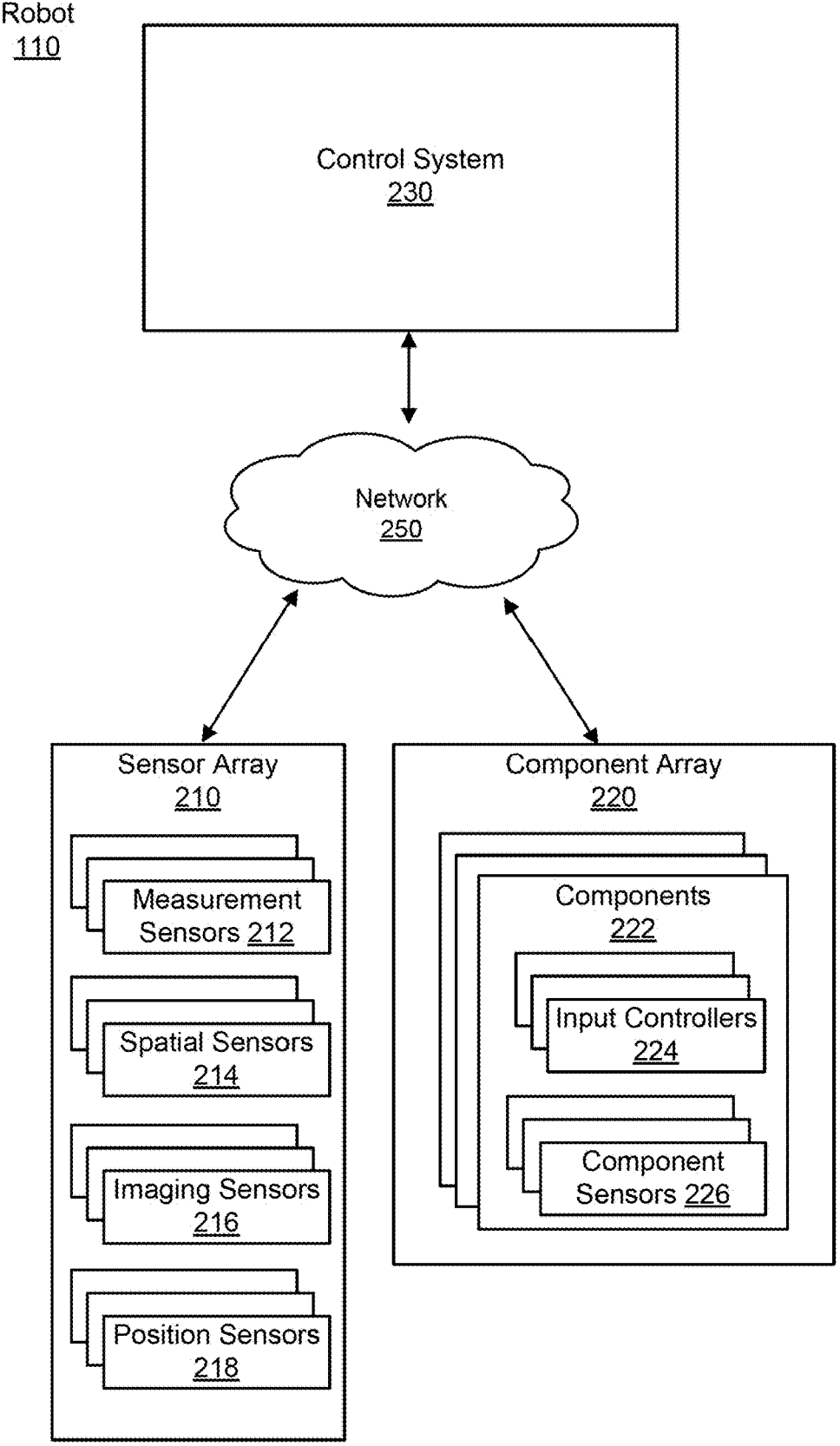
FIG. 2 is a block diagram of the robot of FIG. 1, in accordance with some embodiments.

FIG. 2 is a block diagram of the robot 110 of FIG. 1, in accordance with some embodiments. As shown in FIG. 2, the robot 110 includes a sensor array 210, a component array 220, and a control system 230, each communicatively coupled via a network 250. It should be noted that in other embodiments, the robot 110 may include different, fewer, or additional components than those illustrated in FIG. 2.

The sensor array 210 includes a combination of one or more of: measurement sensors 212, spatial sensors 214, imaging sensors 216, and position sensors 218. The sensor array 210 is configured to collect data related to the robot 110 and environmental data surrounding the robot 110. The control system 230 is configured to receive the data from the robot 110 and carry out instructions based on the received data to perform various autonomous operations. The autonomous operations related to navigating the robot may include a path planning operation, a navigation operation, an occupancy grid generation operation, a footprint generation operation, etc. Other autonomous operations related to construction operations depend on the type of robot performing the operation. For example, a pile driving system may perform autonomous operations such as pile basket assembly operation, pile basket loading operation, pile basket distribution operation, pile distribution operation, pile loading operation, etc. Each sensor is either removably mounted to the robot 110 without impeding the operation of the robot 110 or is an integrated component that is a native part of the robot 110 as made available by its manufacturer. Each sensor transmits the data in real-time or as soon as a network connection is achieved, automatically without input from the robot 110 or a human operator. Data recorded by the sensor array 210 is used by the control system 230 and/or the central server 130 of FIG. 1 to perform the various autonomous operations.

Measurement sensors 212 generally measure properties of the ambient environment, or properties of the robot 110 itself. These properties may include tool position/orientation, relative articulation of the various joints of the arm supporting the tool, vehicle speed, ambient temperature, hydraulic pressure (either relative to capacity or absolute) including how much hydraulic capacity is being used by the drive system and the driving tool separately. A variety of possible measurement sensors 212 may be used, including hydraulic pressure sensors, linear encoders, radial encoders, inertial measurement unit sensors, incline sensors, accelerometers, strain gauges, gyroscopes, and string encoders.

The spatial sensors 214 output a three-dimensional map in the form of a three-dimensional point cloud representing distances, for example between one meter and fifty meters between the spatial sensors 214 and the ground surface or any objects within the field of view of the spatial sensor 214, in some cases per rotation of the spatial sensor 214. In one embodiment, spatial sensors 214 include a set of light emitters (e.g., Infrared (IR)) configured to project structured light into a field near the robot 110, a set of detectors (e.g., IR cameras), and a processor configured to transform data received by the infrared detectors into a point cloud representation of the three-dimensional volume captured by the detectors as measured by structured light reflected by the environment. In one embodiment, the spatial sensor 214 is a LIDAR sensor having a scan cycle that sweeps through an angular range capturing some or all of the volume of space surrounding the robot 110. Other types of spatial sensors 214 may be used, including time-of-flight sensors, ultrasonic sensors, and radar sensors.

Imaging sensors 216 capture still or moving-video representations of the ground surface, objects, and environment surrounding the robot 110. Example imaging sensors 216 include, but are not limited to, stereo RGB cameras, structure from motion cameras, and monocular RGB cameras. In one embodiment, each camera can output a video feed containing a sequence of digital photographic images at a rate of 20 Hz. In one embodiment, multiple imaging sensors 216 are mounted such that each imaging sensor captures some portion of the entire 360-degree angular range around the vehicle. For example, front, rear, left lateral, and right lateral imaging sensors may be mounted to capture the entire angular range around the robot 110.

The position sensors 218 provide a position of the robot 110. This may be a localized position within a geographic area, or a global position with respect to latitude/longitude, or some other external reference system. In one embodiment, a position sensor is a global positioning system interfacing with a static local ground-based GPS node mounted to the robot 110 to output a position of the robot 110.

There are a number of different ways for the sensor array 210 generally and the individual sensors specifically to be constructed and/or mounted to the robot 110. This will also depend in part on the design or construction of the robot 110. The number, location, type or mounting position of the sensors for the robot 110 is not intended to be limiting, so long as the sensors can operate to enable the autonomous operations described.

Generally, individual sensors as well as the sensor array 210 itself range in complexity from simplistic measurement devices that output analog or electrical systems electrically coupled to a network bus or other communicative network, to more complicated devices which include their own onboard computer processors, memory, and the communications adapters. Regardless of construction, the sensors and/or sensor array together function to record, store, and report information to the control system 230. Any given sensor may record, or the sensor array may append to recorded data time stamps for when data was recorded.

The sensor array 210 may include its own network adapter (not shown) that communicates with the control system 230 either through either a wired or wireless connection. For wireless connections, the network adapter may be a Bluetooth Low Energy (BTLE) wireless transmitter, infrared, or 802.11 based connection. For wired connection, a wide variety of communications standards and related architecture may be used, including Ethernet, a Controller Area Network (CAN) Bus, or similar. In the case of a BTLE connection, after the sensor array 210 and the control system 230 have been paired with each other using a BLTE passkey, the sensor array 210 automatically synchronizes and communicates sensor data to the control system 230. If the sensor array 210 has not been paired with the control system 230 prior to operation, the information is stored locally until such a pairing occurs. Upon pairing, the sensor array 210 communicates any stored data to the control system 230.

The component array 220 includes one or more components 222. The components 222 are elements of the robot 110 that can perform different actions. Non-limiting examples of the components 222 include the articulated arm, pile loading mechanism, pile driving mechanism, driving tools, a drive system. Other examples of components 222 may include components for performing one or more of the various autonomous operations (e.g., path planning operation, navigation operation, pile basket assembly operation, pile basket loading operation, pile basket distribution operation, pile distribution operation, pile loading operation, pile driving operation, obstacle map creation operation, quality control operation, pile removal operation). As illustrated in FIG. 2, each component has one or more input controllers 224 and one or more component sensors 226, but a component may include only sensors or only input controllers. An input controller controls the function of the component. For example, an input controller may receive machine commands via the network and actuate the component in response. A component sensor 226 generates measurements within the system environment. The measurements may be of the component, the robot 110, or the environment surrounding the robot 110. For example, a component sensor 226 may measure a configuration or state of the component 222 (e.g., a setting, parameter, power load, etc.), or measure an area surrounding the robot (e.g., moisture, temperature, etc.).

The control system 230 may be configured to control the robot 110 to perform operations based on data from the sensor array 210 and data from the component array 220. For example, the control system may generate an occupancy map of a geographic area based on the sensor data. The control system may also be configured to include obstacle data on the occupancy map based on the sensor data. The control system is further configured to use the occupancy map to control one or more components 222 of the component array to autonomously navigate to a desired waypoint or perform an operation while avoiding obstacles. The operation and functionality of the control system 230 is described in greater detail in FIG. 4.

The network 250 connects nodes of the robot 110 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the sensor array 210 and the component array 220, processes the information, and transmits the information to the control system 230. The control system 230 generates instructions to execute different steps of the different autonomous operations based on the information and transmits the instructions to carry out the steps of the autonomous operations to the appropriate component(s) 222 of the component array 220. In other embodiments, the components may be connected in other types of network environments and include other networks, or a combination of network environments with several networks. For example, the components may be connected in a network such as the Internet, a LAN, a MAN, a WAN, a mobile wired or wireless network, a private network, a virtual private network, a direct communication line, and the like.

Figure 3A:
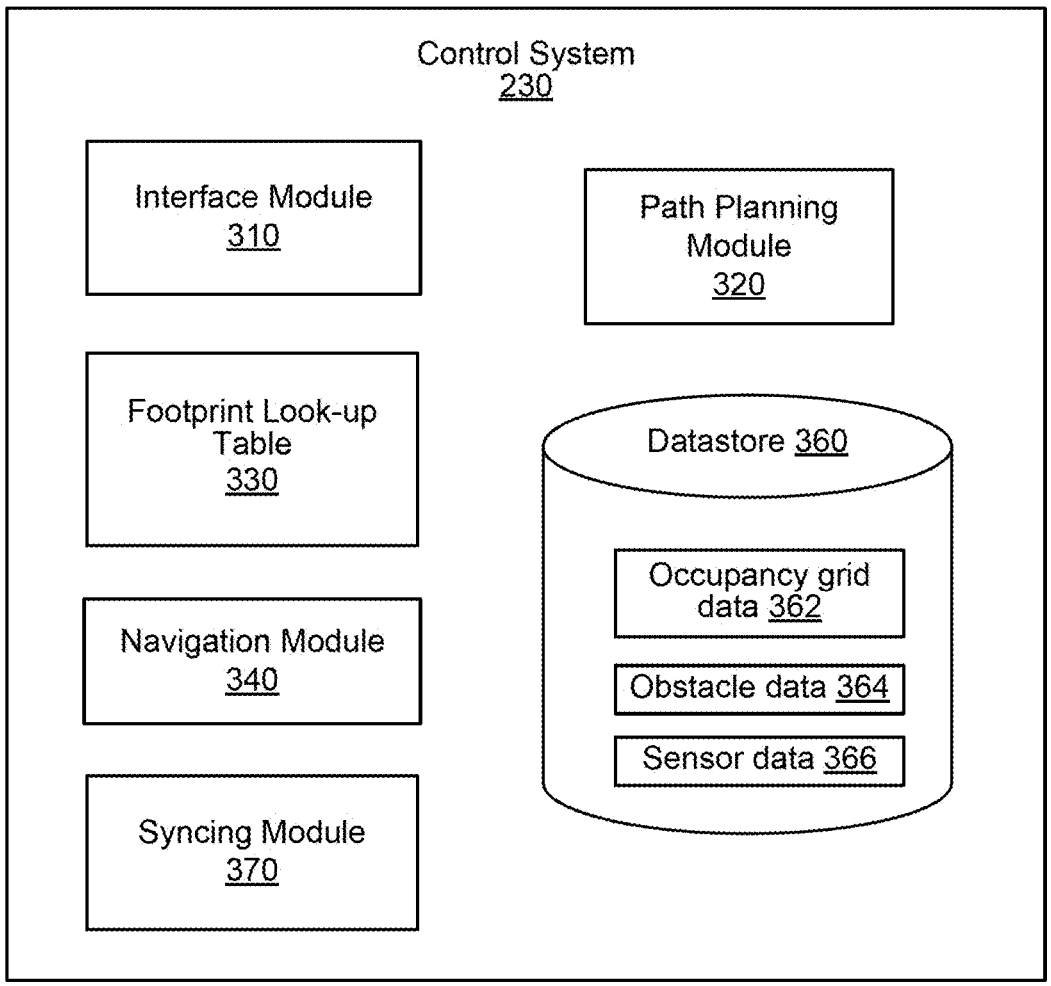
FIG. 3A is a block diagram of the control system of the robot of FIG. 2, in accordance with some embodiments.

FIG. 3A is a block diagram of the control system of the robot of FIG. 2, in accordance with some embodiments. Referring to FIG. 3A, the control system 230 includes a datastore 360, an interface module 310, a navigation module 340, a path planning module 320, and a syncing module 370. The control system 230 may be implemented on the client server 130. As described in FIG. 2, the control system may communicate with one or more robots over a network. The control system is configured to receive sensor data and component data from the robots, and can instruct the robot to perform a desired autonomous operation by controlling one or more components of the robot.

The interface module 310 is an interface for a user and/or a third-party software platform to interact with the control system 230. The interface module 310 may be a web application that is run by a web browser on a user device or a software as a service platform that is accessible by a user device through a network (e.g., network 160 of FIG. 1). In some embodiments, the interface module 310 may use application program interfaces (APIs) to communicate with user devices or third-party platform servers, which may include mechanisms such as webhooks.

The path planning module 320 may be configured to generate a path plan for a robot from a starting location to one or more waypoints. The waypoints may indicate locations that a robot may visit to perform a desired operation. The path planning module may include an occupancy grid generator 380, a footprint generator 382, and a path generator module. The path planning module 320 may be configured to generate an occupancy grid based on a geographic area in which the robot operates. The robot may use the occupancy grid to navigate the geographic area to perform desired operations. The path planning module 320 may implement a path planning algorithm, which uses the occupancy grid to generate a path from the current position of the robot to a desired destination location (e.g., waypoint). The path planning module 320 320 may be further configured to perform fast collision checking using the generated planned path. The path planning module 320 is discussed in further detail in FIG. 3B.

The footprint look-up table 330 may be configured to store precomputed footprints of the robot. The footprint look-up table 330 may be implemented as a software or hardware module, or as a combination of both software and hardware. The footprint look-up table is described below in further detail in FIGS. 4 and 6.

The navigation module 340 is configured to autonomously navigate the robot to a location within a geographic area. The navigation module 340 may actuate the one or more components to navigate the robot to a location. The navigation module 340 may receive from the path planning module 320, a generated planned path to a location to perform a desired operation. For instance, the navigation module 340 can, in response to identifying a task or function to be performed by the robot 110 (e.g., drive a pile into the ground), identify a location associated with the identified task or function (e.g., based on occupancy grid), and can select a route from a current location of the robot 110 to the identified location, and autonomously navigate along the selected route in the geographic area.

The datastore 360 may be configured to store different types of data utilized, generated, or received by the control system 230 for performing the different autonomous operations. In the embodiment illustrated by FIG. 3A, the datastore 360 stores occupancy grid data 362, obstacle data 364, and sensor data 366. The sensor data 366 may include data obtained from the sensors of the sensor array 210. The occupancy grid data 362 may include data associated with the occupancy grid generated by the path planning module 320. The obstacle data 364 may include data associated with the location, shape, and properties of obstacles in the geographic area. The obstacle data 364 may be determined from sensor data 366. In other embodiments, obstacle data may be added manually by a user (e.g., site engineer) if obstacles in the geographic area are static and known in advance. In different embodiments, the control system 230 may include fewer or additional components. The control system 230 may also include different components. Additionally, some of the data or functionality described in connection with the control system 230 may be subsumed by other components, such as the central server 130 of FIG. 1.

The syncing module 370 may be configured to synchronize and update in real-time, the obstacle data 364 of the obstacle map across multiple robots based on obstacle mapping operations simultaneously being performed by multiple robots. The synced obstacle data 364 may then be broadcast to all robots operating in the geographic area so that performance of operations by the multiple robots like the path planning operation, the navigation operation, and the like, accounts for all of the obstacles within the geographic area. In some embodiments, the syncing module 370 may be configured to transmit a local state of the obstacle data 364 to a central server (e.g., server 130 of FIG. 1) periodically or based on other criteria (e.g., every time an update is made to the local state of the map, user operation, etc.). The server may be configured to maintain a master state of the obstacle data 364 based on respective local state updates received from one or more robots operating in the geographic area. The server may further be configured to broadcast the master state of the occupancy grid to the respective one or more robots to update the local state at each robot. Based on the received broadcast of the master state, the syncing module 370 may update the local state of the occupancy grid, thereby syncing the obstacle data 364 of the occupancy grid with the server. The autonomous operation by the robot may then be performed based on the updated local state of the occupancy grid of the robot.

Figure 3B:
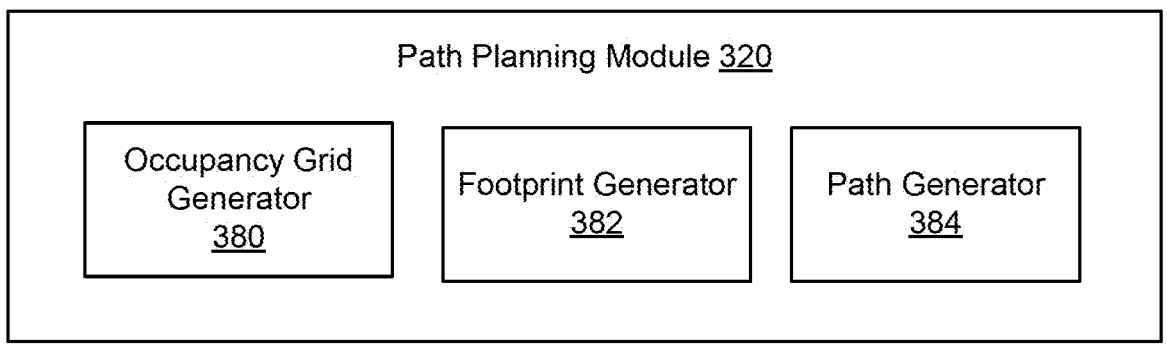
FIG. 3B is a block diagram of an example path planning module, in accordance with some embodiments.

FIG. 3B is a block diagram of an example path planning module, in accordance with some embodiments. The path planning module 320 may be configured to determine an optimal path from a start location to a destination location within a geographical area. In various embodiments, the path planning module 320 may be a software module (e.g., code stored on a machine-readable medium). The path planning module 320 may include an occupancy grid generator 380, a footprint generator 382, and a path generator 384.

The occupancy grid generator 380 may be configured to generate an occupancy grid (also referred to as a cell grid) of the geographic area. The occupancy grid may be used to represent the geographic area in which a robot operates and may be used by the robot to navigate the geographic area. The occupancy grid may be used to indicate locations (e.g., waypoints) in the geographic area which the robot should visit. The occupancy grid may be a grid of evenly sized cells corresponding to the geographic area, where each cell corresponds to a portion of the geographical area. Each cell of the occupancy grid may be assigned an occupancy status. The occupancy status of each cell may be used to indicate obstacles and inaccessible areas of the geographic area, and to use the occupancy grid for collision checking. The occupancy grid generator may use the obstacle data 364 from the datastore 360 to assign an occupancy status to cells in the occupancy grid.

In some embodiments, the occupancy grid generator 380 may implement a mapping algorithm to generate an occupancy grid. In other embodiments, the occupancy grid may be developed manually by a user (e.g., site engineer), who may manually mark cells which are occupied or free to traverse based on prior knowledge or visual inspection. In other embodiments, the occupancy grid generator 380 may use pre-existing map data. The occupancy grid generator may store the occupancy grid in the datastore 360. Occupancy map generation is further discussed below in FIG. 4 through 5B.

The footprint generator 382 may be configured to generate footprints of the robot. A footprint of the robot may be a spatial representation (e.g., shape and size) of the robot when viewed from above and may be used for path planning and collision checking. The footprint is a set of cells within the cell grid which represent portions of the geographic area taken up by the robot. A footprint may be generated by converting a top view representation of a robot to a grid-based representation for use with the occupancy grid.

A footprint may be generated for the robot at a location and orientation (e.g., pose), and joint state. The robot may employ various types of joints to operate attached tools. Some examples of joints include prismatic joints and revolute joints (also referred to as articulate joints). For example, the implementation of a combination of prismatic and revolute joints allows a robot to operate tools such as buckets, blades, drills, and other applicable tools. During robot operation, the joints of the robot may cycle through different states, and each joint state may correspond to a different robot footprint. The footprint generator 382 stores the data associated with the generated footprints in the footprint lookup table. The process of generating and storing footprint data is further described in FIG. 5A through 6.

The path generator 384 may be configured to generate a collision-free planned path for the robot from a starting location to a destination location using the occupancy grid and generated footprints of the robot. The path generator 384 may implement a path planning algorithm to generate a planned path for the robot. Some examples of path planning algorithms that can be used may include graph-based algorithms such as A-star (e.g., A*) algorithm or Dijkstra's algorithm, sampling-based algorithms such as rapidly exploring random trees (RRT) or probabilistic roadmaps (PRM), potential field approaches, or any combination thereof. The path generator 384 may further perform collision checking for candidate robot poses to evaluate candidate paths. The path generator 384 may determine that a candidate path is not viable if any collisions are detected along the candidate path. A collision occurs when a footprint of the robot overlaps with occupied cells in the occupancy grid. The path generator 384 may perform fast collision checks by accessing the footprint look-up table 330 for precomputed footprints of the robot. The collision checking process is further described in FIG. 4 through 7.

FIG. 4 is a flowchart that depicts an example process for generating a planned path for a robot, in accordance with some embodiments. The occupancy grid generator partitions 405 a representation of a geographic area into an occupancy grid. As described in FIG. 3B, the occupancy grid generator 380 may generate an occupancy grid (e.g., cell grid) for a geographic area in which the robot operates. The occupancy grid may be a grid of evenly sized cells, each cell corresponding to a portion of the geographic area. The occupancy grid may be a two-dimensional grid of cells. In other embodiments, the occupancy grid can be of higher dimensionality. The size of the cells may be determined based on a desired resolution of the grid, and available computational resources.

The occupancy grid may be used to indicate locations (e.g., waypoints) in the geographic area which the robot should visit. The waypoints may be determined by a user (e.g., site engineer). In other embodiments, the waypoints may be generated automatically based on sensor data. For example, the robot may be configured to recognize, using an image sensor, visual markers that are placed in the geographic area and perform a desired task. The occupancy grid may also be used to indicate obstacles or an inaccessible area by assigning each cell an occupancy status. The occupancy status of each cell may be represented in binary, probability values, or graded scales. For example, occupied cells may have an assigned occupancy status of "1", while unoccupied (e.g., free to traverse) cells may have an assigned occupancy status of "0".

In some embodiments, the occupancy grid may be generated using a mapping algorithm using sensor data 366. The mapping algorithms may use obstacle data 364 from the datastore 360 to generate the occupancy grid. Some examples of mapping algorithms that may be used include probabilistic occupancy grid mapping algorithms such as recursive Bayes filter and Markov localization, grid-based fusion algorithms, and simultaneous localization and mapping (SLAM) algorithms, or any combination thereof. The mapping algorithms may determine the occupancy status of the cells in the occupancy grid using the obstacle data 364. In some embodiments, the occupancy grid may be developed manually by a user (e.g., site engineer). The user may manually identify cells which are occupied or free to traverse based on prior knowledge. In other embodiments, the occupancy grid may be generated using pre-existing map data, simulated sensor data, or any combination thereof. In some embodiments, the occupancy status of each cell of the occupancy grid may be updated as the robot traverses along planned paths and collects new sensor data 366.

The occupancy grid may be implemented as an array or matrix data structure, with each element in the array corresponding to a cell in the occupancy grid. The size of the array is determined by the grid resolution. Each cell can be identified using map indices, each cell may be associated with a row index value (e.g., x) and a column index value (e.g., y). In some embodiments, a mathematical transform is used to convert between map indices (e.g., x, y) of a cell in the occupancy grid and corresponding real-world coordinates (e.g., latitude, longitude). An origin or reference point in the occupancy grid is identified. The origin allows the occupancy grid generator 380 to determine the mathematical transform by determining the position of other cells with respect to the origin. The occupancy grid generator may store the generated occupancy grid in the datastore 360.

The footprint generator generates 410, for each of a plurality of combinations of orientation and joint state of a robot, a footprint of the robot within the occupancy grid. The footprint generator 382 may compute a footprint of the robot at a predetermined orientation precision (e.g., granularity). For example, the footprint generator 382 may compute a footprint of the robot for every one degree in rotation. The footprint look-up table 330 may store the mapping of the rotation value (e.g., θ) to the map indices corresponding to the cells occupied by the robot at that rotation value. In other embodiments, the footprint look-up table 330 may store precomputed footprints of the robot at every orientation and at every tool position.

The footprint generator stores 415 the generated footprints within a footprint look-up table. In embodiments where the geographic area and occupancy map is large, storing the pre-computed footprints corresponding to each x, y coordinate at every orientation, and at every joint position, is not feasible due to the storage needed. As such, the footprint generator may only generate and store pre-computed footprints for every robot orientation and joint position. In embodiments where the robot does not have one or more joints, each joint with more than one state, the footprint generator may only generate and store pre-computed footprints for every robot orientation.

The path generator generates 420 a planned path for the robot to traverse within the geographic area. The path generator may receive a starting location and one or more waypoints and may determine the order in which the robot visits the waypoints. In some embodiments, the path generator 384 may implement a path planning algorithm configured to generate an initial collision-free path between a starting location and a waypoint or destination location. The path planning algorithm may determine and evaluate a plurality of candidate robot poses to determine the feasibility of candidate paths to the destination location. As described in FIG. 3B, some examples of path planning algorithms that can be used may include graph-based algorithms such as A-star (e.g., A*) algorithm or Dijkstra's algorithm, sampling-based algorithms such as rapidly exploring random trees (RRT) or probabilistic roadmaps (PRM), potential field approaches, or any combination thereof. In other embodiments, path planning algorithms may generate a partial path, and updates the path as the robot traverses the partial path and collects more sensor data.

The path generator identifies 425 combinations of orientation and joint state of the robot at cells within the occupancy grid corresponding to the robot as the robot traverses the planned path, for instance within a simulation of a traversal of the planned path by a simulation of the robot. The path generator may determine, using the path planning algorithm, a plurality of candidate robot poses in the occupancy grid. Each of the plurality of candidate robot poses may correspond to a combination of location and orientation (e.g., x, y, θ) values, and joint state values.

The path generator queries 430 the look-up table with the identified combinations of orientation and joint state to identify a set of footprints of the robot as the robot traverses the planned path. For each candidate robot pose identified by the path planning algorithm, the path generator 384 uses the orientation and joint state values corresponding to a candidate robot pose to access the footprint look-up table 330. In response, the footprint look-up table 330 returns footprint data of the robot corresponding to the orientation and joint state. The footprint data may include map indices of each cell corresponding to the footprint. For example, each cell of the footprint may correspond to (x, y) map indices, where x may represent a row of the occupancy grid, while y may represent a column of the occupancy grid. Querying the footprint look-up table is further described in FIG. 6.

The path generator identifies 435 path conflicts by applying the identified set of footprints of the robot at cells within the cell grid corresponding to the robot as the robot traverses the planned path. To perform collision checking for a candidate robot pose, the path generator positions the corresponding footprint on the occupancy grid to determine if the footprint overlaps with any obstacles indicated by the occupancy grid. For each cell of the footprint, the path generator adds the x, y location values of the candidate robot pose generated by the path planning algorithm to the x, y map index of each cell. The addition operations may be computed quickly, as the operations are independent and can be executed in parallel. The path generator 384 may perform collision checking by determining the occupancy status of each cell of the occupancy grid that is covered by the footprint of the robot. A candidate robot pose is viable if the footprint of the robot does not overlap with an occupied cell.

Figure 5A:
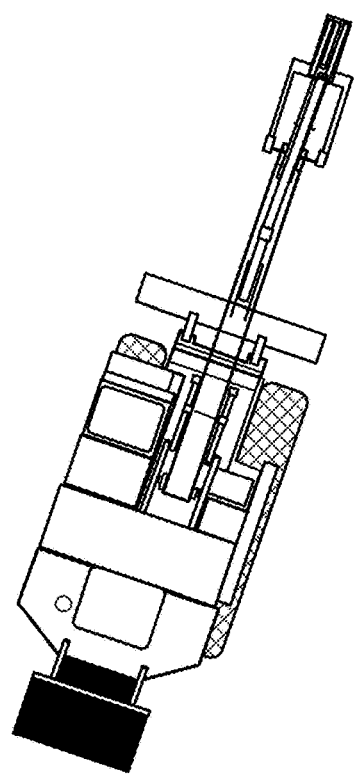
FIG. 5A is a conceptual diagram which illustrates a top view of an example robot, in accordance with some embodiments.
Figure 5B:
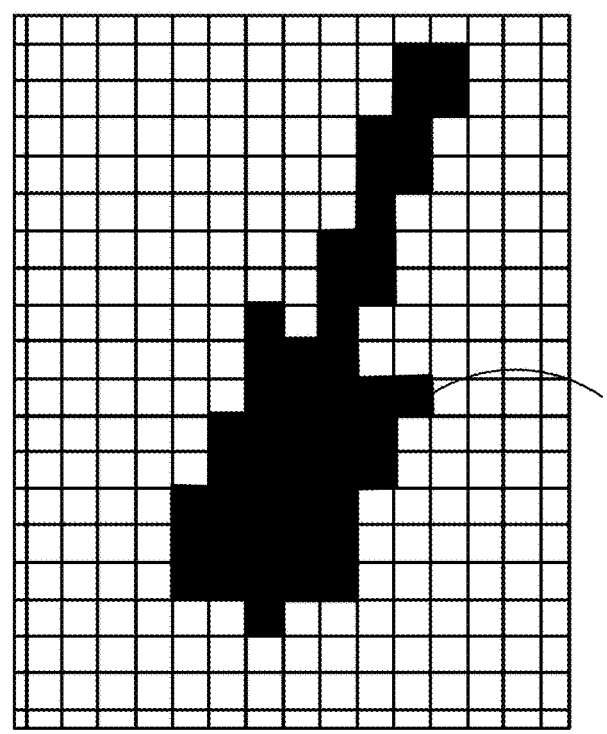
FIG. 5B is a conceptual diagram which illustrates an example footprint generated for the robot in FIG. 5A, in accordance with some embodiments.

FIG. 5A shows a top view of an example robot 500, in accordance with some embodiments. The top view of the robot 500 may be used to generate the footprint 510 illustrated by FIG. 5B. The footprint is represented by cells 515 which are filled in. The top view of the robot may be generated by a user (e.g., site engineer, construction manager, etc.) in software, or captured using a variety of sensors such as image and depth sensors. The robot's real-world measurements are mapped to a grid-based representation of the robot for use with the occupancy grid. As described in FIG. 4, a mathematical transform may be used to convert coordinates from the top view representation of the robot to coordinates in the occupancy grid. A plurality of footprints of the robot at a plurality of orientations and joint state may be generated, as the footprint of a robot may have different shapes and sizes depending on the tool position of the robot. For example, robots have multi-element arms with multiple joints that are coordinated to operate the tool of the robot, as described in FIG. 2. In particular, the excavator arm (also referred to as a stick) is attached to the boom of the excavator. The excavator arm may be controlled to extend forward, away from the main body of the excavator, or retracted towards the main body of the excavator. As such, a footprint corresponding to the excavator with an extended arm may occupy more cells than when the excavator retracted arm.

Figure 6:
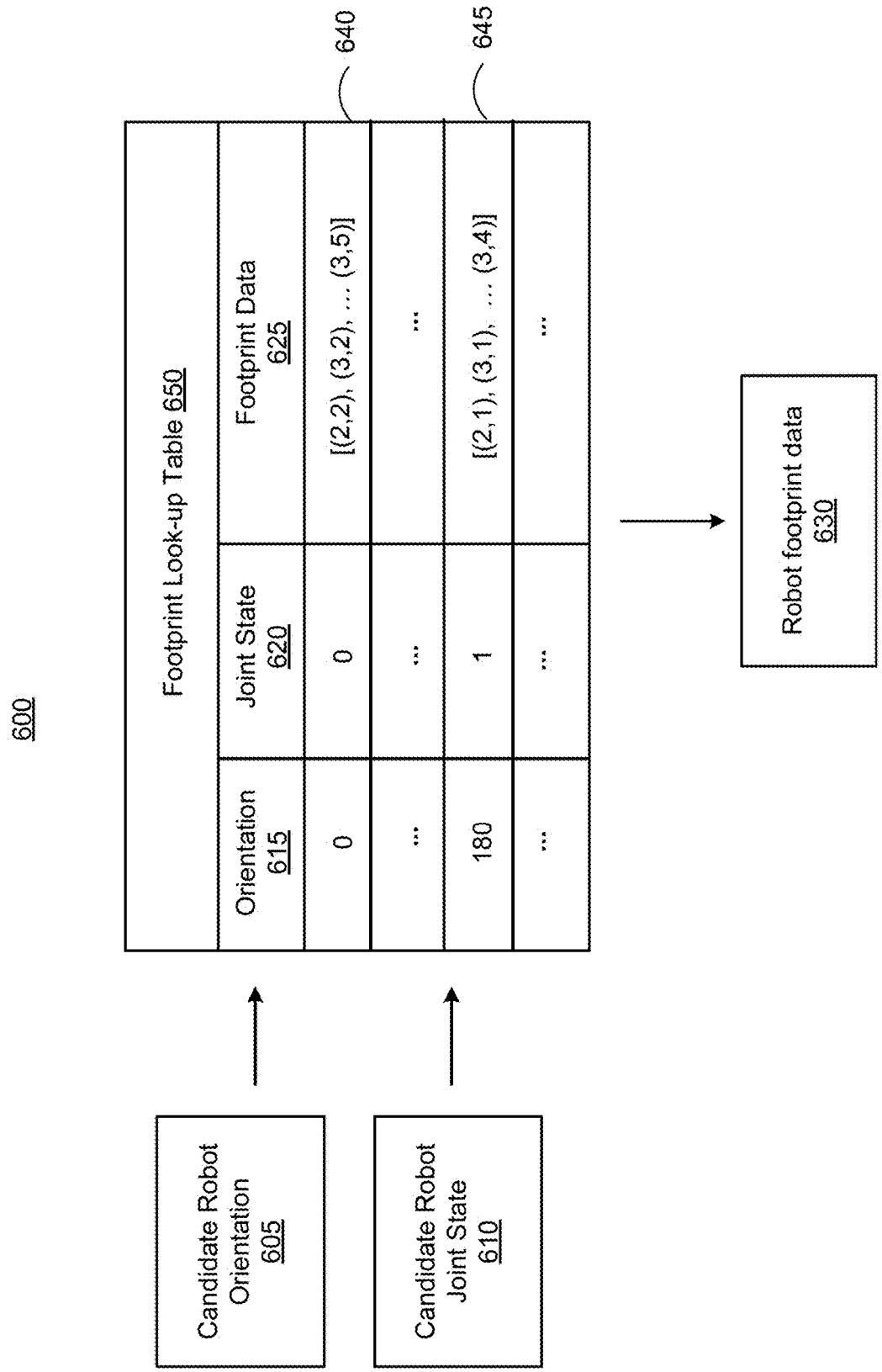
FIG. 6 is a conceptual diagram illustrating an example footprint look-up table, in accordance with some embodiments.

FIG. 6 is a conceptual diagram illustrating an example footprint look-up table, in accordance with some embodiments. The footprint look-up table 650 may be configured to store data associated with the footprints generated by the footprint generator 382. In the embodiment illustrated by FIG. 6, the footprint look-up table 650 stores precomputed footprints of the robot at every orientation 615 (e.g., rotation) and joint state 620. The orientation 615 values are presented in degrees. In this example, the robot has more than one joint state, and the joint state has a numerical representation (e.g., "0", "1"). For example, an earth-moving vehicle such as an excavator has an arm (also referred to as stick) with multiple joints and can be extended or retracted. A joint state may correspond to the arm in an extended state, while another joint state may correspond to the arm in a retracted state. In footprint look-up table 650, a combination of orientation 615 (e.g., θ) and joint state 620 is mapped to corresponding footprint data 625. The footprint data 625 including map indices corresponding to the cells occupied by the robot at the associated orientation 615 and joint state 620.

To determine the feasibility of a candidate robot pose, the path generator 384 queries the footprint look-up table 650 using the candidate robot orientation 605 and the candidate robot joint state 610. In response, the footprint look-up table 650 returns the corresponding footprint data 630. For example, the path generator 384 may query the footprint look-up table 650 for a candidate robot orientation value "0" and a "0" joint state. In response, the footprint look-up table 650 returns footprint data including the map indices listed in table cell 640.

Figure 7:
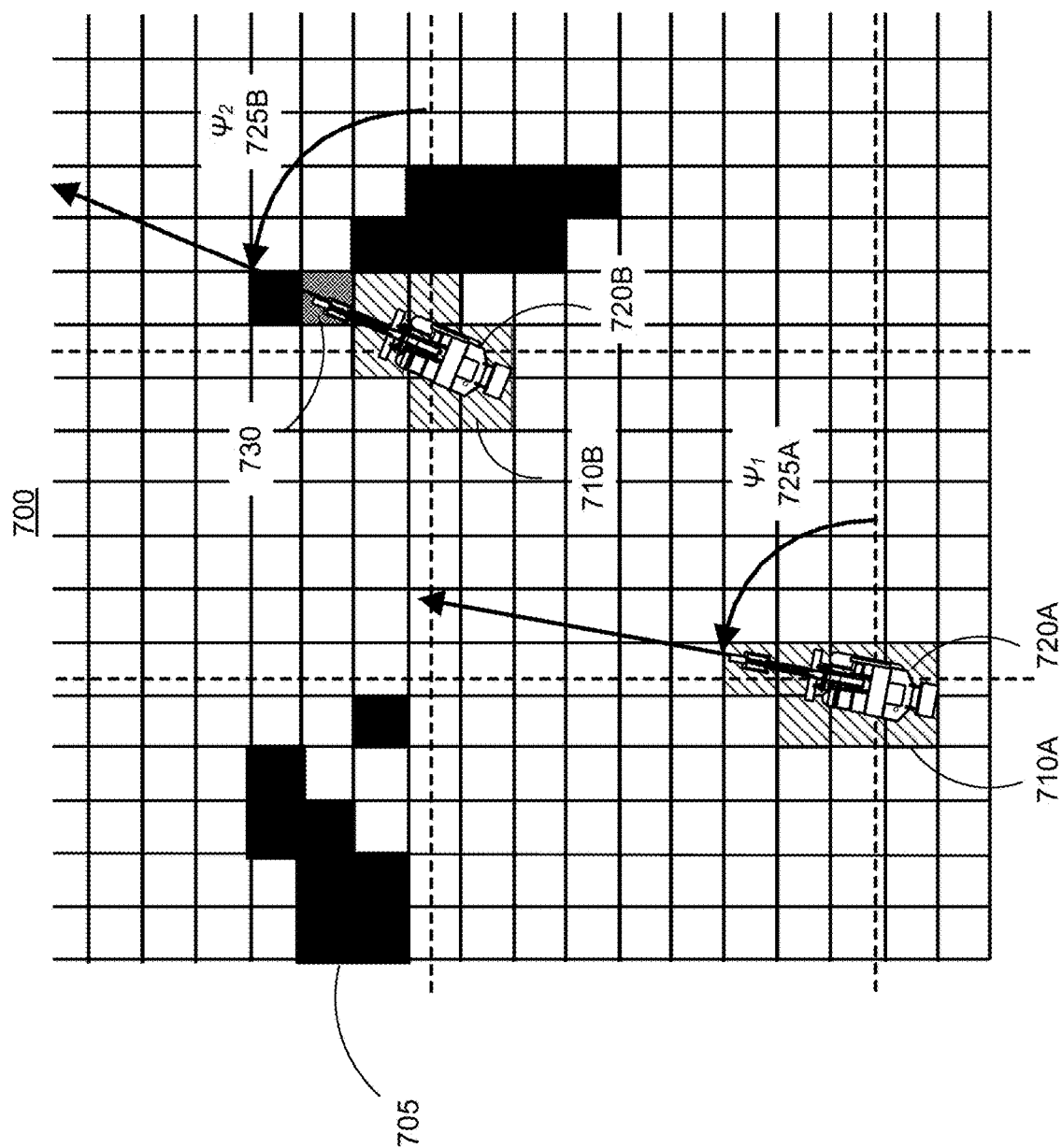
FIG. 7 is a conceptual diagram illustrating an example process of performing collision checks for candidate robot poses, in accordance with some embodiments.

FIG. 7 is a conceptual diagram illustrating an example process of performing collision checks for candidate robot poses, in accordance with some embodiments. Obstacles 705 are represented by cells that are filled in. A first robot 720A travels in a North-East direction at an orientation 725A and a first joint state. The path generator may query the footprint look-up table using orientation 725A and the first joint state, and receives the map indices of cells of the occupancy map that corresponds to the footprint. The path generator computes the position of the footprint 710A in the occupancy map by adding the candidate x, y coordinate values to each of the cells in the footprint. The path generator determines if a collision will occur by determining, for each cell of the footprint 710A, if the cell is already occupied.

Similarly, a second robot 720B travels in a North-East direction at an orientation 725B and a second joint state. The path generator may query the footprint look-up table using orientation 725B and the second joint state, and receives the map indices of cells of the occupancy map that corresponds to the footprint. The path generator computes the position of the footprint 710B in the occupancy map by adding the candidate x, y coordinate values to each of the cells in the footprint. The path generator determines if a collision will occur by determining, for each cell of the footprint 710B, if the cell is already occupied. In this example, a collision will occur as footprint 710B overlaps with an occupied cell 730. In response to detecting a collision, the path generator explores alternative candidate robot poses and computes a new collision-free path.

Example Computer System

Figure 8:
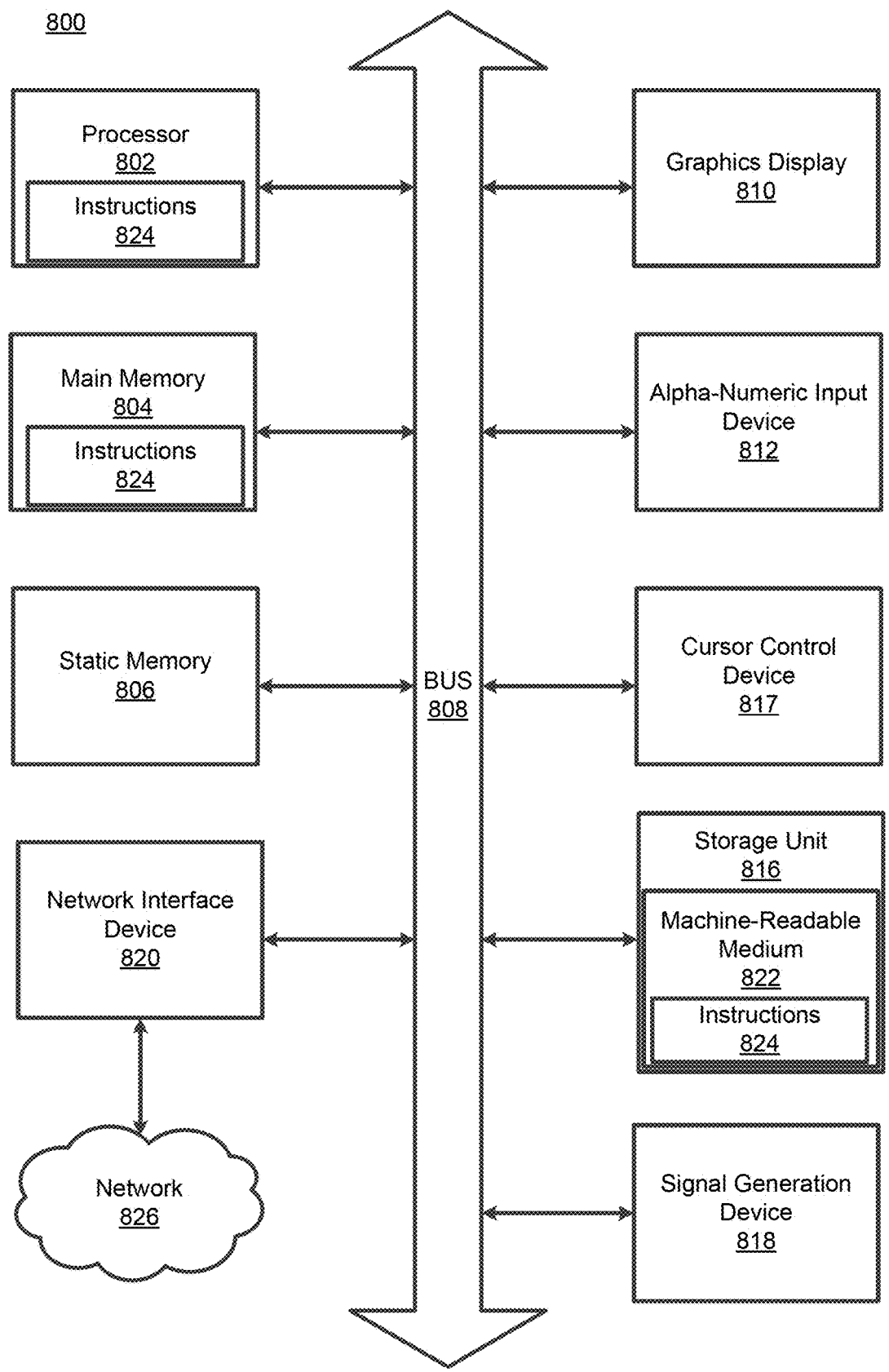
FIG. 8 is a block diagram illustrating components of an example machine for reading and executing instructions from a machine-readable medium, in accordance with one or more example embodiments.

FIG. 8 is a block diagram illustrating components of an example machine for reading and executing instructions from a machine-readable medium, in accordance with one or more example embodiments. Specifically, FIG. 8 shows a diagrammatic representation of one or more of the central server 130 of FIG. 1, the client device 140 of FIG. 1, the control system 230 of FIG. 2, and machines for performing the process 600 of FIG. 6, in the example form of a computer system 800.

The computer system 800 can be used to execute instructions 824 (e.g., program code or software) for causing the machine to perform any one or more of the methodologies (or processes) or modules described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include an alphanumeric input device 812 (e.g., a keyboard), a cursor control device 817 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of one or more of the central server 130 of FIG. 1, the client device 140 of FIG. 1, the control system 230 of FIG. 2, and the machines for performing the process 600 of FIG. 6. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
generating, for each of a plurality of combinations of orientation and joint state of a robot, a footprint of the robot within a cell grid representative of a geographic area, wherein the footprint comprises a plurality of cells within the cell grid corresponding to a portion of the geographic area occupied by a simulated robot at a particular orientation and arm position;
generating a planned path for the robot to traverse within the geographic area; and
during a simulation of a traversal of the planned path by a simulated robot, identifying path conflicts based on the generated footprints of the simulated robot corresponding to an orientation and arm position of the simulated robot at each location along the planned path.

2. The method of claim 1, wherein the planned path comprises a pre-computed candidate route from a starting point to an ending point.

3. The method of claim 1, wherein each cell of the cell grid is assigned an occupancy value that indicates whether a cell is occupied.

4. The method of claim 1, wherein the generated footprints are stored in a look-up table.

5. The method of claim 4, wherein the look-up table stores grid indices of each cell corresponding to each footprint of a set of footprints.

6. The method of claim 1, wherein identifying path conflicts further comprises:
computing, for each cell corresponding to each footprint of a set of identified footprints, a position of the cell within the cell grid.

7. The method of claim 1, wherein identifying path conflicts further comprises:
determining, for each cell corresponding to each footprint of a set of identified footprints, whether the cell is occupied.

8. A non-transitory computer-readable medium storing comprising stored instructions that, when executed by one or more processors, cause the one or more processors to:
generating, for each of a plurality of combinations of orientation and joint state of a robot, a footprint of the robot within a cell grid representative of a geographic area, wherein the footprint comprises a plurality of cells within the cell grid corresponding to a portion of the geographic area occupied by a simulated robot at a particular orientation and arm position;
generating a planned path for the robot to traverse within the geographic area; and
during a simulation of a traversal of the planned path by a simulated robot, identifying path conflicts based on the generated footprints of the simulated robot corresponding to an orientation and arm position of the simulated robot at each location along the planned path.

9. The non-transitory computer-readable medium of claim 8, wherein the planned path comprises a pre-computed candidate route from a starting point to an ending point.

10. The non-transitory computer-readable medium of claim 8, wherein each cell of the cell grid is assigned an occupancy value that indicates whether the cell is occupied.

11. The non-transitory computer-readable medium of claim 8, wherein the generated footprints are stored in a look-up table.

12. The non-transitory computer-readable medium of claim 11, wherein the look-up table stores grid indices of each cell corresponding to each footprint of a set of footprints.

13. The non-transitory computer-readable medium of claim 8, the instructions to identify path conflicts further comprises instructions to compute, for each cell corresponding to each footprint of a set of identified footprints, a position of the cell within the cell grid.

14. The non-transitory computer-readable medium of claim 8, the instructions to identify path conflicts further comprises instructions to determine, for each cell corresponding to each footprint of a set of identified footprints, whether the cell is occupied.

15. A central server comprising:
one or more computer processors; and
a non-transitory computer-readable storage medium storing executable instructions that, when executed by the one or more computer processors, cause the one or more computer processors to:
generating, for each of a plurality of combinations of orientation and joint state of a robot, a footprint of the robot within a cell grid representative of a geographic area, wherein the footprint comprises a plurality of cells within the cell grid corresponding to a portion of the geographic area occupied by a simulated robot at a particular orientation and arm position;
generating a planned path for the robot to traverse within the geographic area; and
during a simulation of a traversal of the planned path by a simulated robot, identifying path conflicts based on the generated footprints of the simulated robot corresponding to an orientation and arm position of the simulated robot at each location along the planned path.

16. The central server of claim 15, wherein the planned path comprises a pre-computed candidate route from a starting point to an ending point.

17. The central server of claim 15, wherein each cell of the cell grid is assigned an occupancy value that indicates whether the cell is occupied.

18. The central server of claim 15, wherein the generated footprints are stored in a look-up table.

19. The central server of claim 18, wherein the look-up table stores grid indices of each cell corresponding to each footprint of a set of footprints.

20. The central server of claim 15, the instructions to identify path conflicts further comprises instructions to compute, for each cell corresponding to each footprint of a set of identified footprints, a position of the cell within the cell grid.

* * * * *